United States Patent [19]

Strand

[11] 4,164,971
[45] Aug. 21, 1979

[54] THREADED FASTENER PRODUCT WITH ADHESIVE COATING

[75] Inventor: Norman S. Strand, Howell, Mich.

[73] Assignee: Federal Screw Works, Detroit, Mich.

[21] Appl. No.: 737,558

[22] Filed: Nov. 1, 1976

[51] Int. Cl.² .............................................. F16B 39/00
[52] U.S. Cl. ................... 151/14.5; 10/10 P;
10/86 A; 85/1 C; 156/330; 260/29.2 EP;
260/31.8 E; 260/33.6 EP; 260/37 EP; 428/307;
428/402
[58] Field of Search ............ 151/14.5, 7; 85/1 C,
85/10 F; 10/10 P, 86 A; 156/330; 260/31.8 E,
33.6 EP, 29.2 EP; 428/307

[56] References Cited

U.S. PATENT DOCUMENTS

| | | | |
|---|---|---|---|
| 3,396,116 | 8/1968 | Adams et al. | 151/14.5 |
| 3,746,068 | 7/1973 | Deckert et al. | 151/14.5 |
| 3,814,156 | 6/1974 | Bachmann et al. | 151/14.5 |
| 3,964,948 | 6/1976 | Busse | 428/307 |
| 4,081,012 | 3/1978 | Wallace | 151/14.5 |

OTHER PUBLICATIONS

Exhibit J "NCR Microencapsulation the Process and its Capabilities", 1971.

*Primary Examiner*—Herbert J. Lilling
*Attorney, Agent, or Firm*—Harness, Dickey & Pierce

[57] ABSTRACT

This disclosure relates to a new fastener means for use on bolts, screws, nuts, threaded surfaces and the like which includes an adhesive composition comprised of a solid particulate adhesive, such as a low molecular weight crystalline adhesive or a high molecular weight non-crystalline solid thermoset resin, and a curing agent. The adhesive composition also includes a film forming carrier such as latex in which said solid particulate adhesive is dispersed and which does not dissolve nor react with said adhesive, and a microencapsulated solvent dispersed in said film forming carrier which acts upon the solid particulate adhesive to effect a cure. The adhesive composition may be applied over oily surfaces such as phosphate and oil coated bolts, without destroying the corrosion resistant phosphate and oil coating, and still provides excellent fastening properties. A fastener coated with said adhesive composition may be installed and removed several times without losing retaining properties, and this is believed due to the fact that only a portion of the microencapsulated solvent is used each time.

9 Claims, 3 Drawing Figures

THREADED FASTENER PRODUCT WITH ADHESIVE COATING

BACKGROUND OF THE INVENTION

1. Field of the Invention

The present invention pertains primarily to fastening means for use on bolts, screws, nuts and the like, and more particularly to fastening means which include an adhesive composition.

2. Description of the Prior Art

The state of the art is believed to be indicated by the following cited references: U.S. Pat. No. 3,179,143—Schultz et al; U.S. Pat. No. 3,642,937—Deckert et al; U.S. Pat. No. 3,746,068—Deckert et al; U.S. Pat. No. 3,485,132—Hanny et al; U.S. Pat. No. 3,639,137—Marinelli; U.S. Pat. No. 2,939,805—Johnson; U.S. Pat. No. 3,061,455—Anthony; U.S. Pat. No. 3,251,708—Schmetterer et al; U.S. Pat. No. 3,467,544—Marinelli et al; U.S. Pat. No. 3,043,820—Krieble; U.S. Pat. No. 3,046,262—Krieble; U.S. Pat. No. 3,704,264—Gorman; U.S. Pat. No. 3,293,977—Dalton et al; U.S. Pat. No. 3,489,599—Krieble; U.S. Pat. No. 2,895,950—Krieble; U.S. Pat. No. 3,425,988—Gorman; U.S. Pat. No. 3,275,579—Stierli et al; U.S. Pat. No. 3,018,258—Meier et al; and U.S. Pat. No. 3,218,305—Krieble.

Generally, adhesive compositions for use in fastener retention have consisted of several different adhesive families depending upon the application and the assembly requirements. Typical of the prior art are the adhesives such as heat curing epoxies, anaerobic adhesives, deformable plastic strips placed over the fasteners, or two separate strips of adhesive coated onto the fastener which are then mixed upon installation of the fastener. Some prior art systems have encapsulated one component of a two-component epoxy system with the mixing of such a system being accomplished when the fastener was installed.

One major consideration in choosing a fastener retention system is the ease with which it can be integrated to the assembly process. If the adhesive is not pre-applied to the fastener, it must be applied just prior to assembly and often is wet, tacky and rather messy. If the adhesive can be pre-applied, it could be dried to provide for handling and transportation prior to assembly. Some prior art adhesive systems are dried by baking, which is normally an expensive step in the process and uses valuable energy. Other prior art systems use an air dry, but most take a considerable amount of time, and require storage during the drying period.

Other requirements of various industries such as the automotive industry require that the fasteners be corrosion resistant. As an example, some automotive manufacturers' specifications for bolts require that the bolts be coated with phosphate and oil to help them resist corrosion. Many of the prior art adhesives appear to destroy the phosphate and oil coating thus reducing the corrosion resistance of the bolt.

An additional problem encountered in many of the applications of such adhesive compositions in fastener retention is that of multiple usage. Multiple usage is the term used to describe repeated installation and removal of the same fastener. Typical of the industry tests of such properties is the "fifth off" test. This test measures the capability of the same adhesive coated fastener to be used five times. The fifth off value is the break away torque encountered in an effort to loosen the bolt after the fifth installation. Most prior art systems can only be used once, or at best, twice.

Another disadvantage of many prior art systems is that of the high torque requirements for installation. Normally, coating a fastener or the like with an adhesive or a deformable plastic strip causes the torque required to install the fastener to increase substantially. Very often this puts undue constraints on the assembly process and may even cause stripping or shearing of fasteners during installation.

It is a principle object of the present invention therefore to provide an improved adhesive composition for use as a fastening means on bolts, nuts, screws and the like.

Another object is to provide a new and improved fastener product which includes a unique adhesive system.

It is a further object of the present invention to provide a relatively inexpensive, non-tacky adhesive composition which is applied as a single composition in a high speed assembly process.

It is another object of the present invention to provide an adhesive composition which does not destroy corrosion resistant coatings such as phosphate and oil and also has good multiple usage properties.

Other objects, features and advantages of the present invention will become apparent from the subsequent description, and examples, and the appended claims taken in conjunction with the accompanying drawings.

SUMMARY OF THE INVENTION

In accordance with the present invention, a combination fastener-adhesive system is provided wherein the adhesive composition is comprised of a solid particulate adhesive, a film forming carrier in which said solid particulate adhesive is dispersed and which does not dissolve nor react with said adhesive, and a microencapsulated solvent dispersed in said film forming carrier which acts upon the solid particulate adhesive to effect a cure. In use, the adhesive composition may be applied directly over the threaded portion of a bolt or the like and then air dried. When the fastener is later installed, the mechanical action of a nut upon a coated bolt breaks up some of the "bubbles" of encapsulated solvent, which mix with and dissolve the adhesive, thus effecting a cure of the adhesive.

BRIEF DESCRIPTION OF THE DRAWINGS

The foregoing objects and others will be pointed out more fully hereinafter in conjunction with the description of the preferred embodiment of the present invention illustrated in the accompanying drawings and examples and in which.

DESCRIPTION OF THE PREFERRED EMBODIMENT

Figure 1:
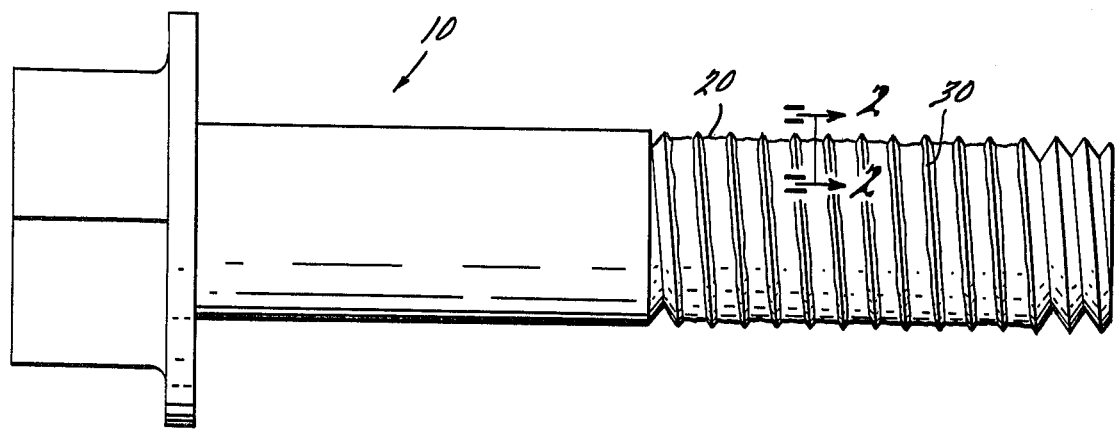
FIG. 1 is a side elevational view of the present invention as shown on a bolt.

Referring now to the drawings wherein the showings are for the purpose of illustrating a preferred embodiment of the invention only and are not for the purpose of limiting the invention, FIG. 1 shows a bolt 10 which is partially coated with adhesive composition 20. Said adhesive composition 20 is applied to the threaded portion 30 of bolt 10 in the area in which the bolt will be later secured by means of a nut or the like.

Figure 2:
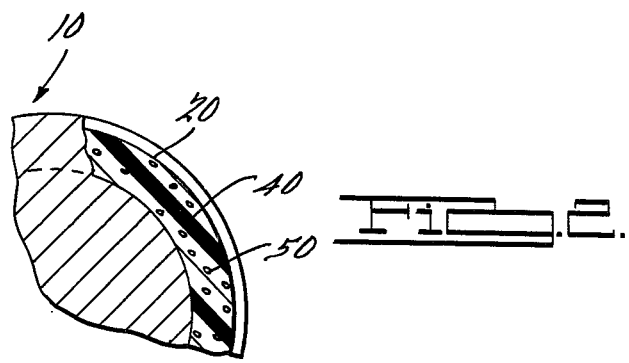
FIG. 2 is a cross-sectional view of the present invention along line 2—2 as shown on a bolt.

FIG. 2 shows the adhesive composition 20 as applied to bolt 10. Said adhesive composition 20 is comprised of a film forming carrier 40, such as a latex carrier, and the solid particulate adhesive; in addition, a microencapsulated solvent 50 is dispersed throughout the adhesive composition 20.

Figure 3:
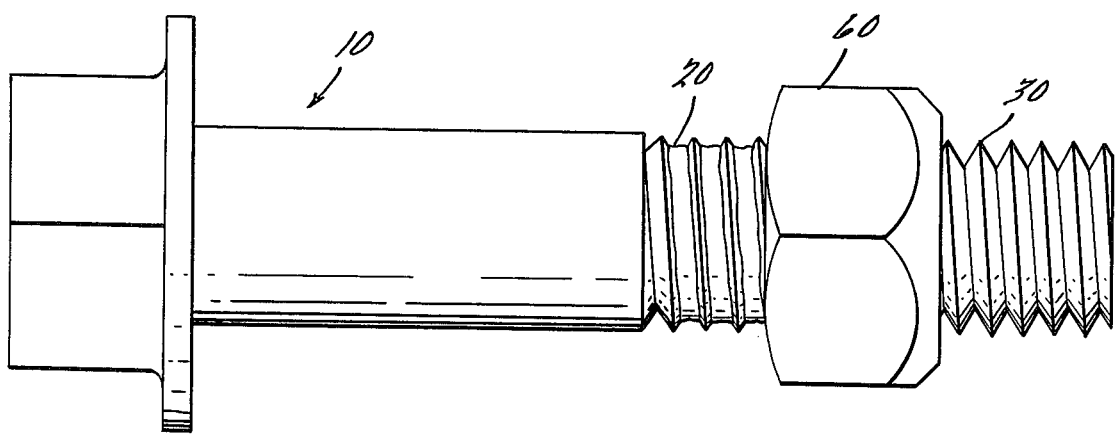
FIG. 3 is a side elevational view of the present invention in use to secure a nut to a bolt.

FIG. 3 shows the same bolt 10 and a nut 60 which is secured to said bolt 10 by means of the adhesive composition 20.

The adhesive composition of the present invention is comprised of three major components. The first component is solid particulate adhesive, the second a film forming carrier to carry said adhesive, and the third a microencapsulated solvent dispersed in said film forming carrier. The solid particulate adhesive may be comprised of a low molecular weight crystalline adhesive resin and a curing agent in sufficient amount to cure said resin, or a high molecular weight non-crystalline solid thermoset resin and curing agent. An example of a crystalline adhesive resin is a crystallizable liquid epoxy resin, diglycidyl ether of bisphenol A such as Dow Chemical epoxy 332. Examples of non-crystalline solid resins include Shell epoxy 1001, Dow Chemical epoxy 662, vinyl ester neat resin, or acrylic ester neat resin. In either case the crystallized or solid resins are later pulverized into a powder.

The curing agent for use with the low molecular weight crystalline adhesive resin may be a crystalline amine or a peroxide. It, too, is pulverized into a powder. An example of such a crystalline amine is 4-di-piperadine or other solid amines such as methylene dianiline (MDA). Said curing agent may also contain an accelerator or an activator. An example of such an accelerator for use with an amine is bisphenol A. In addition, a higher molecular weight non-crystalline amine curing agent such as a polyamine may be used with the low molecular weight crystalline adhesive resin. The curing agent for use with the high molecular weight non-crystalline solid thermoset resin may be any of the types enumerated above for use with the low molecular weight crystalline adhesive resin.

The pulverized adhesive resin and the pulverized curing agent are both dispersed in a film forming carrier such as a water based latex. An example of such a latex carrier is SBR latex or acrylic latex such as Dow Chemical latex 238 or 283. The solid particulate adhesive is dispersed in this film-forming carrier which does not dissolve nor react with the adhesive.

The microencapsulated solvent should be a water resistant non-reactive solvent. The solvent is microencapsulated so that it is kept separated from the solid particulate adhesive resin and the solid particulate curing agent. Examples of such microencapsulated solvents are the NCR encapsulated solvents such as xylene, chlorothene, and dioctyl phthalate.

The adhesive composition of the present invention may also contain imbiber beads which absorb oil found on the fastener prior to application of the adhesive composition. The imbiber beads are incorporated into the adhesive resin. The imbiber beads are used to absorb oil and to increase the mechanical locking strength of the fastener system due to their expansion after oil absorption. An example of such imbiber beads is Dow Chemical alkylstyrene polymer (sold under the trademark "Dow Imbiber Beads" and marketed by Gedcor Environmental Protection Corporation, Westland, Michigan). The adhesive composition may also contain hydrophobic fumed silica which is used to prevent particles of the pulverized adhesive from absorbing water from the latex carrier. A finely divided hydrophobic fumed silica is distributed in both the adhesive resin and the curing agent and is also believed to form a film around these adhesive particles and lessen the chances of any appreciable reaction occurring between these adhesive particles. An example of such hydrophobic fumed silica is Tullanox by Tulco Company.

The adhesive compsion may also contain a filler such as glass beads which provide abrasive interference and additonal mechanical interlock for the fastener system. It has been found that glass beads, such as those obtained from Potter's Industries, function the best in the applications tested. Other fillers that may be used include silicon carbide, silica, quartz, beta eucryptite, alumina, and saran micro-balloons.

The adhesive composition may also contain glass fibers such as Johns-Manville Company HDK glass fibers which are used as a reinforcing material to increase the strength of the cured adhesive. These fibers would be added to the adhesive resin. Fumed silica may also be used to increase adhesion. An example of such fumed silica is Syloid 244, manufactured by Davison Chemical Division of Grace Company.

In the manufacture of an adhesive composition using a low molecular weight crystallizable liquid adhesive resin such as Dow Chemical epoxy 332, the resin would be blended with all the fillers in a high shear mixer to give a pasty material. Into the paste is mixed a crystalline amount of the epoxy which seeds it. The whole mass crystallizes in about 48 hours at normal room conditions. The material is then chilled and ground up in a mill.

An amine curing agent such as 4-di-piperadine would be heated up to about 200° F. to melt the different amines, at which time the accelerator is added. Hydrophobic fumed silica is then blended into the amine along with the other fillers. This whole mass is allowed to cool and crystallize prior to being pulverized.

The amine part and the epoxy part in powdered form are then mixed with the latex carrier until fully blended. This mass is then mixed with the encapsulated solvent.

It has also been found that the use of a coloring pigment in both the adhesive resin and the curing agent is an aid to quality control. As an example, a visible coloring pigment such as chromium yellow may be put in either part, thus indicating that this part is present. Then a coloring pigment such as Day-glow Invisible Blue fluorescent pigment No. A-594-5 may be put in the other part, and after the mixing step, a fluorescent light may be used to determine whether or not both parts are present.

EXAMPLE 1

An exemplary formulation of a preferred embodiment of the present invention which has been found to provide excellent performance properties is given below:

Part A: Crystalline Adhesive Resin

| Ingredient | Amount by Weight |
| --- | --- |
| Dow epoxy 332 Crystallizable liquid resin | 1000 |
| Potter's Industries glass beads (filler) | 270 |
| Syloid 244 fumed silica | 7 |

-continued

| Ingredient | Amount by Weight |
| --- | --- |
| Johns-Manville HDK fiber glass | 175 |
| Dow imbiber beads (alkylstyrene polymer) | 35 |
| Tullanox hydrophobic fumed silica | 18 |
| Chromium yellow color pigment | 5 |

Part B: Crystalline Curing Agent

| Ingredient | Amount by Weight |
| --- | --- |
| 4-di-piperadine curing agent | 477.4 |
| MDA accelerator | 238.7 |
| Tullanox hydrophobic fumed silica | 10 |
| Day-glow Invisible Blue A-594-5 fluorescent color pigment | 2 |

Part C: Dow latex 238 film forming carrier (43–48% solids in H$_2$O)

Part D: NCR xylene microencapsulated solvent

A stoichiometric relationship exists between Part A and Part B in that enough of Part B must be supplied to effect a full cure of Part A. It has been found that with the above-listed formulation, three parts by weight of Part A and one part by weight of Part B provides such a stoichiometric relationship. With regard to Part C, enough must be supplied to be film forming and to carry Part A and Part B. Approximately 10–20% of Part D is used. The following ratio has been found to be satisfactory:

| Part | Amount by Weight |
| --- | --- |
| A | 50.25 |
| B | 16.75 |
| C | 100.0 |
| D | 16.7 |

EXAMPLE 2

The following tests were conducted to compare the performance characteristics of the adhesive composition described in Example 1 of the present invention with those of 3 M Scotch-Grip 2353, a material believed to be representative of the current state of the art. All tests were conducted on threaded half-inch bolts and nuts having a phosphate and oil coating, using Ford Motor Company Engineering Performance Specification Number ES-20007-S100 as a guide. All numerical values are given in inch-pounds of torque, and are average values. The "Prevailing-on Torque" is the torque encountered in the on direction measured prior to adhesive curing, when the nut is completely in engagement with the adhesive portion of the male thread. The "Break-away Torque" is the torque encountered in the off direction which breaks the cured adhesive bond between the threads of the nut-bolt assembly. The "Prevailing-off Torque" is the torque encountered in the off direction measured after the cured adhesive bond has been broken. Normally the tension of the nut-bolt assembly without any adhesive is assumed to be zero.

| TEST | 3m Scotch-Gr:P 2353 | Formulation of Example 1 of Present Invention | Ford Motor Co. Specification Requirement |
| --- | --- | --- | --- |
| 1. First application | | | |
| Prevailing-on Torque | 9.7 in.-lbs. | 23.4 in.-lbs. | less than 80 in.-lbs. |
| Break-away Torque | 169 in.-lbs. | 240 in.-lbs. | greater than 140 in.-lbs. |
| Prevailing-off Torque | 90 in.-lbs. | 210 in.-lbs. | greater than 90 in.-lbs. |
| 2. Second application | | | |
| Prevailing-on Torque | 169 in.-lbs. | 90 in.-lbs. | none |
| Break-away Torque | 67 in.-lbs. | 202 in.-lbs. | greater than 42 in.-lbs. |
| Prevailing-off Torque | 47 in.-lbs. | 210 in.-lbs. | greater than 27 in.-lbs. |
| 3. Fifth application | | | |
| Prevailing-on Torque | — | 43.5 in.-lbs. | — |
| Break-away Torque | — | 40.5 in.-lbs. | — |
| Prevailing-off Torque | — | 49 in.-lbs. | — |

It should be noted that in comparing the performance of the two formulations, the formulation of Example 1 of the present invention has consistently better "Break-away Torque" and "Prevailing-off Torque" values than 3 M Scotch-Grip 2353. These are the most important performance characteristics of any fastener retention system. More specifically, it should be noted that the "Fifth application Prevailing-off Torque" value of the formulation of Example 1 of the present invention is considerably better than even the "Second application Prevailing-off Torque" value of the 3 M material. This shows a significant advantage to the present invention. It should also be noted that the "Prevailing-on Torque" values of the formulation of Example 1 of the present invention are such that no stripping or shearing of fasteners should occur during installation.

Another advantage of the present invention is that in the second and fifth applications, the "Prevailing-off Torque" is higher than the "Break-away Torque". This indicates that good mechanical retention properties are exhibited by the filler and glass fibers within the adhesive composition, over and beyond the retention caused by the epoxy adhesive.

In addition to the advantages which have heretofore been described, the present invention also is easy to integrate into the assembly process. Normally, the adhesive composition of the present invention would be pre-applied to the fastener. In such case, the adhesive coating may be dried in desiccated air after it is applied to the fastener, which makes the adhesive coating nontacky and easy to store and ship. It has been found that 48 hours is a more than adequate drying time at normal room temperature.

The adhesive composition of the present invention has also been found not to destroy phosphate and oil coatings on bolts, and thus is very attractive to those manufacturers who require bolts to be corrosion resistant. Such requirements are typical of the automotive industry.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A fastener means having a thread connecting system for setting the fastener, wherein said fastener means includes an adhesive composition on said thread, said composition comprising in its uncured state, a solid epoxy particulate adhesive, a film forming carrier in which said adhesive is dispersed and which does not dissolve nor react with said adhesive, and a water resistant, non-reactive microencapsulated solvent dispersed in said film forming carrier, said solvent being operative upon release from its microencapsulated state to mix with and dissolve said adhesive and effect a cure of the adhesive composition.

2. The fastener means of claim 1 wherein said solid epoxy particulate adhesive comprises a low molecular weight crystalline epoxy adhesive resin and a curing agent in sufficient amount to cure said resin.

3. The fastener means of claim 1 wherein said solid epoxy particulate adhesive comprises a high molecular weight non-crystalline solid thermoset epoxy adhesive resin and a curing agent in sufficient amount to cure said resin.

4. The fastener means of claim 2 wherein said curing agent is at least one material selected from the group consisting of an amine and a peroxide; and, wherein said curing agent contains an accelerator.

5. The fastener means of claim 3 wherein said curing agent is at least one material selected from the group consisting of an amine and a peroxide; and, wherein said curing agent contains an accelerator.

6. The fastener means of claim 1 wherein said film forming carrier is a water-based latex carrier.

7. A fastener means with an annular grooves connecting system for setting the fastener, wherein said fastener means includes an adhesive composition on said grooves, said composition comprising in its uncured state, a solid epoxy particulate adhesive, a film forming carrier in which said adhesive is dispersed and which does not dissolve nor react with said adhesive, and a water resistant, non-reactive microencapsulated solvent dispersed in said film forming carrier, said solvent being operative upon release from its microencapsulated state to mix with and dissolve said adhesive and effect a cure of the adhesive composition.

8. A method of manufacturing a combination fastener-adhesive product for use in preventing loosening during service which comprises:
   providing a fastener with annular grooves,
   providing an adhesive composition comprised of in its uncured state, a solid particulate adhesive, a film forming carrier in which said adhesive is dispersed and which does not dissolve nor react with said adhesive, and a water resistant, non-reactive microencapsulated solvent dispersed in said film forming carrier,
   applying said adhesive composition to the annular grooves of said fastener, and
   drying said adhesive composition.

9. A fastener means produced in accordance with the method of claim 8.

* * * * *